United States Patent [19]
Kuster

[11] 3,725,740
[45] Apr. 3, 1973

[54] VOLTAGE MARGINING CONTROL CIRCUIT FOR PROGRAM CONTROLLED POWER SUPPLIES

[75] Inventor: Karl H. Kuster, Glendale Heights, Ill.

[73] Assignee: GTE Automatic Electric Laboratories Incorporated, Northlake, Ill.

[22] Filed: Mar. 27, 1972

[21] Appl. No.: 238,216

[52] U.S. Cl. ............... 317/16, 323/80, 324/34 MC
[51] Int. Cl. ................................................ H02h 9/04
[58] Field of Search ............ 317/16, DIG. 5; 323/80; 324/34 MC, 110; 340/174 TC, 248 R

[56] References Cited

UNITED STATES PATENTS

| 2,673,327 | 3/1954 | Morelock | 324/110 X |
| 2,400,190 | 5/1946 | Clark | 324/110 X |
| 3,524,124 | 8/1970 | Perkinson | 317/16 X |
| 3,243,691 | 3/1966 | Gibson et al. | 323/80 |
| 3,341,775 | 9/1967 | Hyman | 317/16 X |
| 3,492,662 | 1/1970 | Whitson et al. | 324/34 MC |

*Primary Examiner*—A. D. Pellinen
*Attorney*—K. Mullerheim et al.

[57] ABSTRACT

A voltage margining circuit for use with a program controlled power supply wherein relay logic is used to control the output of a monitored power supply during voltage margining of a load during test operations.

8 Claims, 1 Drawing Figure

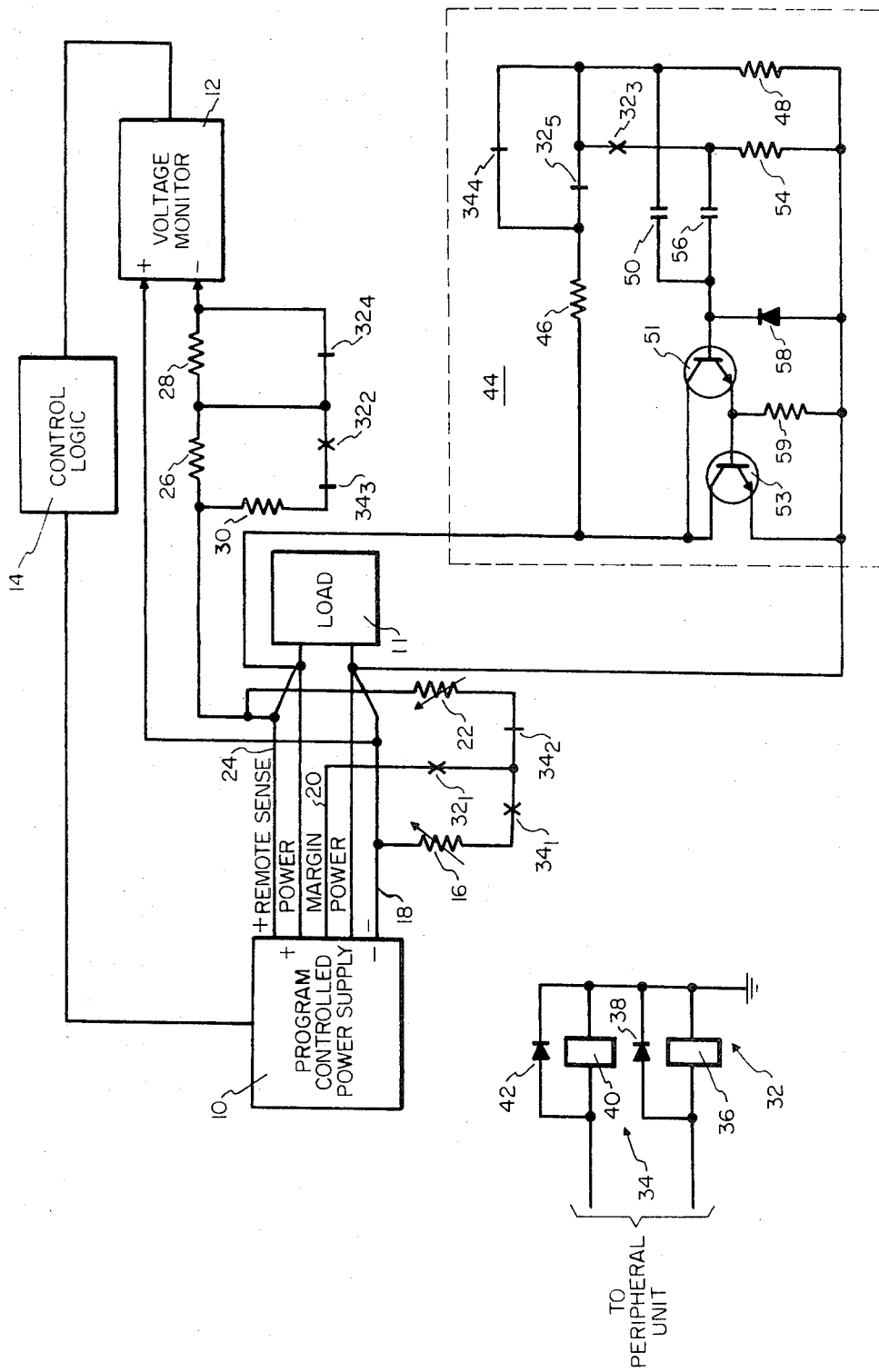

VOLTAGE MARGINING CONTROL CIRCUIT FOR PROGRAM CONTROLLED POWER SUPPLIES

BACKGROUND OF THE INVENTION

1. Field of the Invention

The present invention relates generally to the field of power supplies for electronic equipment and more particularly to a control circuit for margining the output voltage of a program controlled power supply.

2. Description of the Prior Art

With the use of modern solid state logic circuits there has arisen the requirement that the output voltage levels of associated power supplies be closely monitored in order that the logic circuitry may be protected against generally unnoticeable power degradation or failure. To this end various power control and supervisory systems have been developed. One such system is described in co-pending U.S. Pat. application Ser. No. 236,729 of Thomas H. Jeffery and Karl H. Kuster entitled Power Control and Supervisory System, which is assigned to the assignee of the present application. That system is a closed loop type in which a regulated power converter output is monitored and error signals developed to be fed back through the system control logic to control the converter output and automatically sequence the application and removal of electrical power to the load. In order to protect the load circuitry that system operates to automatically remove electrical power in a selected sequence under conditions of degraded power. The power control and supervisory system described in the above-referenced application has been found to operate satisfactorily with conventional electronic systems, however, some systems impose additional output voltage requirements. For example, in the operation of core memory selection matrices for detecting electrical failures it is common to employ voltage margining; i.e. operation of the matrix in an over or under voltage mode.

Margining the output voltage of the regulated power converter described in the above-referenced application presents an additional problem for the voltage monitor of that system, particularly when the margined voltage must itself be monitored without producing an error detection. An error signal from the voltage monitor, in addition to providing the usual types of error indications may also provide automatic power removal from the electronic system. In order to preclude the generation of error signals and/or removal of power during diagnostic testing of the electronic system it is necessary to condition the voltage monitor for operation beyond the normal voltage limits. Additionally it is necessary to compensate the voltage monitor for the transient period which occurs when the power supply output voltage is being margined.

OBJECTS AND SUMMARY OF THE INVENTION

From the preceding discussion it will be understood that among the various objectives of the present invention are included the following:

to provide a new and novel margining control circuit for use with program controlled power supplies;

to provide apparatus of the above-described character for selectively switching the power supply output voltage between nominal, high and low levels;

to provide apparatus of the above-described character which is operable at high and low margined voltages without generating error signals; and to provide apparatus of the above-described character which compensates for transient voltages during margining.

These and other objects of this invention are efficiently achieved by providing switchable resistance elements at the power supply output and at the input to the voltage monitor. These resistances are selectively coupled between the power supply and voltage monitor under the control of the diagnostic program through a peripheral unit to automatically compensate the input of the voltage monitor during periods when the power supply output is margined either high or low during diagnostic testing of the power supply load.

The foregoing as well as other objects, features and advantages of the present invention will be more easily understood from the following detailed description taken in conjunction with the appended drawing.

BRIEF DESCRIPTION OF THE DRAWING

The single appended FIGURE is a schematic diagram of a voltage margining control circuit constructed in accordance with the principles of the present invention.

DESCRIPTION OF THE PREFERRED EMBODIMENT

With reference now to the FIGURE there is shown a program controlled power supply 10 coupled to a load 11. A voltage monitor 12 is coupled to the output of the power supply 10 and control logic 14 is coupled between the voltage monitor 12 output and the power supply 10. Each of these power control system components are described in detail in the above-referenced co-pending application of Jeffery and Kuster and will not be further described herein. The present invention is considered to reside in the voltage margining control circuit for use with that system.

When it is desired to margin the voltage coupled to the load 11 under the control of the diagnostic program through the peripheral unit (not shown) the voltage may be either high or low with respect to the nominal output voltage level. In order to provide a high margined output voltage a first resistor 16 is selectively coupled across the negative remote sense lead 18 of the power supply 10 and the margining output lead 20. Conversely, to provide the low margined output voltage level, resistor 22 is selectively coupled across the positive remote sense lead 24 and the margining output lead 20. In order that the voltage monitor 12 does not detect an error during the high and low margining voltage states of power supply 10 the input resistance must be compensated for the increase or decrease in the normal operating voltage. The voltage monitor input resistor 26 may conveniently be varied by selectively switching either a series resistance 28 or a parallel resistance 30 together with the normal input resistor 26.

The resistor switching function is fulfilled by first and second relays 32 and 34 which are operated under the control of the diagnostic program through the peripheral unit. Relay 32 includes winding 36 coupled in parallel with diode 38 between the peripheral unit and ground potential, normally open contacts $32_1$, $32_2$, and $32_3$, and normally closed contacts $32_4$ and $32_5$. Relay 34 includes winding 40 coupled in parallel with diode 42 between the peripheral unit and ground potential, normally open contacts $34_1$, and normally closed contacts $34_2$, $34_3$ and $34_4$. With the foregoing construction a high margining output voltage is provided when both relays 32 and 34 are energized by the peripheral unit. Relay contacts $32_1$ and $34_1$ are thus closed and contacts $34_2$ are opened thereby coupling high margining resistor 16 across the negative remote sense lead 18 and margining output lead 20 of power supply 10. In order to compensate for this higher than nominal output voltage, relay contacts $32_2$ are closed, while contacts $32_4$ and $34_3$ are opened. Thus high compensating resistor 28 is coupled in series with resistor 26 dropping the input voltage at the voltage monitor 12 to a level within the nominal operating range of the power supply 10 and precluding the generation of an over voltage error signal.

Conversely, when it is desired to margin the voltage of power supply 10 to a lower than nominal level, the peripheral unit operates to energize relay 32 and not relay 34. Under this condition relay contacts $32_1$ are closed, $34_1$ are open and $34_2$ are closed thereby coupling low margining resistor 22 across the positive remote sense lead 24 and margining output lead 20 of power supply 10. To assure that this low output voltage does not result in the generation of an error signal by the voltage monitor 12 relay contacts $34_3$, $32_2$ and $32_4$ are closed thus switching low compensating resistor 30 in parallel with resistor 26 at the input. This reduction in the input resistance is selected to compensate for the low margined voltage.

During nominal operation of the power supply 10 the peripheral unit may either operate relay 34 and not relay 32 or operate neither of them. In either case the margining and compensating resistors are decoupled from the system.

The foregoing relay logic arrangement thus provides high or low voltage margining and voltage monitor compensation in accordance with the following truth table wherein a binary "1" represents an energized relay:

| Relay 32 | Relay 34 | Voltage |
| --- | --- | --- |
| 0 | 0 | Nominal |
| 1 | 0 | Low margin |
| 1 | 1 | High margin |
| 0 | 1 | Nominal |

For the purposes of illustration the Applicant has found that in one embodiment of his invention the following component values were of utility in conjunction with a 12 volt regulated power converter:

| | |
| --- | --- |
| variable resistor 16 | 680 to 5680 ohms |
| variable resistor 22 | 0 to 200 ohms |
| resistor 26 | 237.4 ohms |
| resistor 28 | 12 ohms |
| resistor 30 | 1,088 ohms |

In order to preclude the voltage monitor from generating error signals due to voltage transients occurring when the power supply 10 is switched from nominal to margined operation it is further desirable to provide a transient load schematically shown at 44. The transient load is coupled across the normal load 11 and operates to speed up the voltage slew time from high to nominal, nominal to low and high to low in order to render it independent of the output capacitance value of the power supply 10 and load 11.

When the peripheral unit switches the power supply 10 from high margin to nominal operation relays 32 and 34 are de-energized causing contacts $32_5$ to close, $32_3$ to open, and $34_4$ to close. The power supply output is thus coupled through resistors 46 and 48 to capacitor 50 which charges, causing transistors 51 and 53 to conduct during the transient thus providing the desired transient load. When the power supply 10 is switched from nominal to low margin operation only relay 32 is energized thus opening contacts $32_5$, and closing contacts $32_3$ while contacts $34_4$ remain closed. The power supply output voltage is thus coupled through resistors 46 and 54 to capacitor 56 which charges, causing transistors 51 and 53 to conduct during the transient. When the power supply 10 is switched from high margin to low margin operation both relays 32 and 34 are initially energized and only relay 34 is de-energized. Contacts $32_5$ are thus open, contacts $32_3$ and contacts $34_4$ are closed. The power supply output voltage is thus coupled to both capacitors 50 and 56 as described above and the desired transient load is thereby provided. Diode 58 provides a fast discharge path for capacitors 50 and 56.

The transient load 44 thus operates during negative going changes in the output voltage level of the power supply 10. During positive going changes; i.e. low margin to nominal, nominal to high margin and low margin to high margin, a transient load would operate to slow the slew time of the power supply 10. The relay logic of the present invention operates to couple only resistors 46 and 48 or 46 and 54 across the load 11 during these positive going changes such that transistors 51 and 53 do not conduct.

Again for the purposes of illustration it has been found by the Applicant that the following component values are useful for a transient load 44 of utility with a 12 volt regulated power converter:

| | |
| --- | --- |
| resistor 46 | 5600 ohms |
| resistor 48 | 27000 ohms |
| capacitor 50 | 2 microfarads |
| resistor 54 | 27000 ohms |
| capacitor 56 | 2 microfarads |
| resistor 59 | 27000 ohms |

From the foregoing description it will be seen that the Applicant has provided a voltage margining control circuit for program controlled power supplies whereby monitoring of the power supply output is continuous during voltage margining and the slew time of the margining power supply is controlled externally to the power supply, thus efficiently meeting the objectives set forth hereinabove. Since certain changes in the above-described construction will occur to those skilled in the art, without departure from the scope of the invention, it is intended that all matter contained in the description or shown in the drawing shall be interpreted as illustrative and not in a limiting sense.

Having described what is new and novel and desired to secure by Letters Patent, what is claimed is:

1. A voltage margined program controlled power supply comprising
   a program controlled power supply adapted for coupling to a primary load and including means for monitoring the output thereof and generating error signals when the output voltage deviates from a preselected nominal voltage, and control logic coupled to the output of said monitoring means and providing control signals to said power supply, means for selectively margining the output voltage of said power supply to first and second levels which are relatively higher and relatively lower than said preselected nominal voltage, means for selectively varying the input resistance of said monitoring means to provide a voltage drop which substantially compensates said relatively higher and lower than nominal voltages and thereby substantially precluding generation of error signals when said output voltage of said power supply is margined, and a transient load coupled across said primary load and adapted to operate only during negative going margining changes in the output voltage of said power supply.

2. Apparatus as recited in claim 1 wherein said power supply includes positive and negative remote sense output sampling means and a voltage margining output means, and said selective margining means includes a first margining resistance selectively coupled between said negative remote sense output sampling means and said voltage margining output means and a second margining resistance selectively coupled between said positive remote sense output sampling means, and said voltage margining output means.

3. Apparatus as recited in claim 2 wherein said selectively variable monitoring means input resistance comprises an input resistance coupled to the input of said monitoring means, a first compensating resistance selectively coupled in series with said input resistance, and a second compensating resistance selectively coupled in parallel with said input resistance.

4. Apparatus as recited in claim 3 wherein said selective margining means includes a first relay having a winding and first normally open contacts coupled between said first and second margining resistances and said voltage margining output means, a second relay having a winding, first normally open contacts coupled between said first margining resistance and said first normally open contacts of said first relay, and second normally closed contacts coupled between said second margining resistance and said first normally open contacts of said first relay, and said first and second relays operative when simultaneously energized to couple said first margining resistance between said negative remote sense output sampling means and said voltage margining output means, thereby margining said output voltage relatively higher than nominal, and said first relay operative when energized alone to couple said second margining resistance between said positive remote sense output sampling means and said voltage margining output means thereby margining said output voltage relatively lower than nominal.

5. Apparatus as recited in claim 4 wherein said first relay further includes second normally open contacts coupled between said parallel resistance and said monitoring means, and third normally closed contacts coupled between said second normally open contacts and said monitoring means, said second relay further includes third normally closed contacts coupled between said parallel resistance and said second normally open contacts of said first relay.

6. Apparatus as recited in claim 4 wherein said transient load is adapted for selective operation only during negative going margining changes in the output voltage of said power supply by said first and second relays.

7. Apparatus as recited in claim 7 wherein said transient load includes a first npn transistor having an emitter coupled to the negative polarity side of said primary load and a collector coupled to the positive polarity side of said primary load, a second npn transistor having a collector coupled in parallel with the collector of said first transistor and an emitter coupled in parallel to the base of said first transistor in parallel with the emitter of said first transistor, first and second capacitors coupled at one side to the base of said second transistor, said first relay further includes fourth normally closed contacts coupled in parallel with the collectors of said first and second transistors between said positive polarity side of said primary load and said first capacitor, and fifth normally open contacts coupled between said fourth normally closed contacts and said second capacitor, and said second relay further includes fourth normally closed contacts coupled in parallel with said fourth normally closed contacts of said first relay, whereby said first and second capacitors are selectively charged only during negative going margining changes in the output voltage of said power supply, and operate to bias said transistors into conduction thereby providing a transient load only during said negative going voltage changes.

8. Apparatus as recited in claim 8 further including a diode having a cathode coupled to the base of said second transistor and an anode coupled in parallel with the emitter of said first transistor to the negative polarity side of said primary load.

* * * * *